Figure 1:
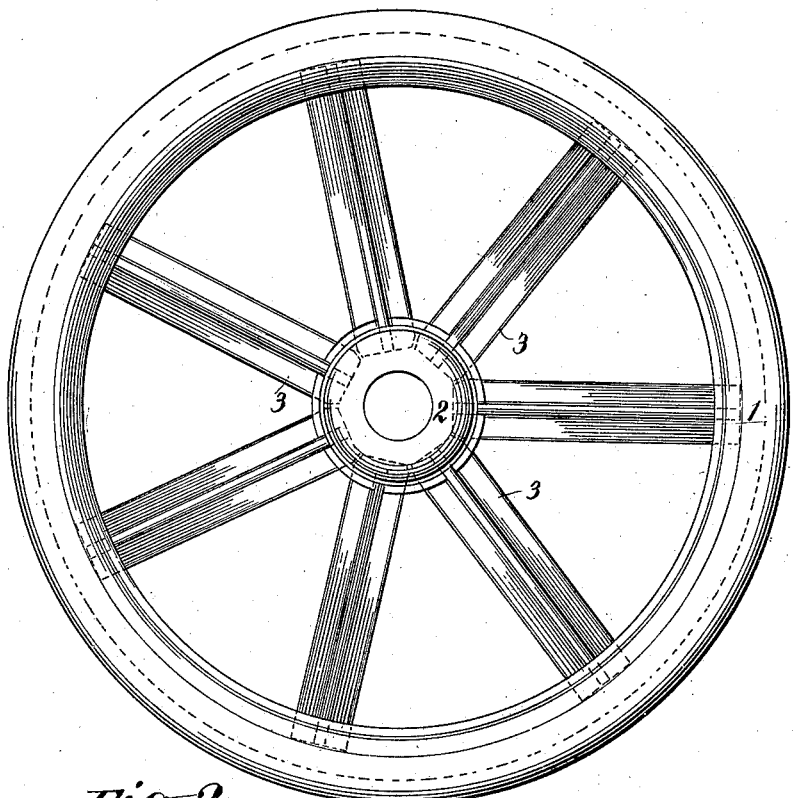

No. 628,693. Patented July 11, 1899.
F. E. CANDA.
CAR WHEEL.
(Application filed May 26, 1898.)
(No Model.)

WITNESSES:

INVENTOR
Ferdinand E. Canda
BY
ATTORNEYS

UNITED STATES PATENT OFFICE.

FERDINAND E. CANDA, OF NEW YORK, N. Y.

CAR-WHEEL.

SPECIFICATION forming part of Letters Patent No. 628,693, dated July 11, 1899.

Application filed May 26, 1898. Serial No. 681,759. (No model.)

*To all whom it may concern:*

Be it known that I, FERDINAND E. CANDA, a citizen of the United States, residing at New York, in the county of New York and State of New York, have invented certain new and useful Improvements in Car-Wheels; and I do hereby declare the following to be a full, clear, and exact description of the invention, such as will enable others skilled in the art to which it appertains to make and use the same.

My invention relates to car-wheels, and resides in a modification of the car-wheel covered by my patent for a car-wheel, No. 605,391, dated June 7, 1898. The car-wheel illustrated and described in said patent consists of a cast-steel rim and hub connected by wrought-iron or steel spokes formed separately from the hub and rim and welded into the hub and rim during the casting of the wheel by the heat of the molten metal and the pressure produced by the solidification and shrinkage thereof.

It has been found desirable in the use of the wheel illustrated and described in my Patent No. 605,391 to form the rim from steel which is quite hard, so that the wheel may resist wear incident to usage as long as possible, care being taken, however, that the steel is not so hard as to be brittle. The steel for the hub, however, must be soft enough to be bored readily for the reception of the axle, and since the hub is not exposed to wear it may be made of much softer steel than is employed in the making of the rim.

My present invention consists, therefore, in making the rim of the wheel of a hard grade of steel and the hub of a softer grade of steel, both hub and rim being welded to the spokes as described in my Patent No. 605,391.

The object of my invention is to provide a welded-steel car-wheel capable of enduring a very great amount of wear and of being fitted to the axle with a small amount of labor and expense. This object is attained in the invention herein described, and illustrated in the drawings which accompany and form a part of this specification, in which the same reference-numerals indicate the same or corresponding parts and in which—

Figure 2:
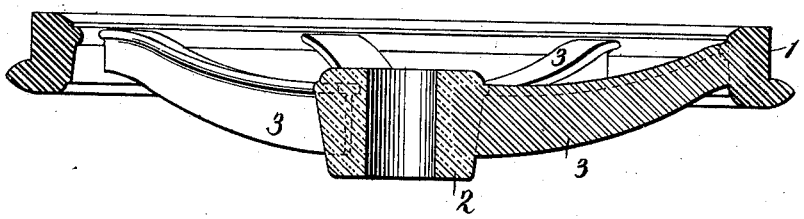

Figure 1 is an elevation of a car-wheel embodying my invention, and Fig. 2 is a diametral section of the wheel.

In the drawings, 1 is the rim of the wheel, and 2 the hub.

3 3 are the spokes, formed of wrought-iron or mild steel and the ends of which project into the rim 1 and hub 2, respectively, and are welded into the rim and hub, so that the whole wheel is in effect one integral mass of metal.

The steel from which the rim is formed is quite hard in order that the wheel may endure the friction of the brake-shoes and the friction against the rails when "skidding" takes place with as little wear as possible. The steel may contain from .75 to 1.10 per cent. of carbon, together with some chromium, to increase its hardness and toughness; but I do not limit myself to the proportions named. The steel for the hub is much lower in carbon and need not contain any chromium. It may be any convenient low-carbon steel.

In making the wheel a mold is made as if the wheel were to be cast entire, separate gates, risers, and vents, however, being provided for the hub and rim molds. The spokes, formed by cutting beams of structural wrought-iron or steel into proper lengths and bending and tapering the blanks, if desired, are then placed within the mold in the recesses formed by the spokes of the pattern, their ends projecting into the rim and hub molds. Before placing the spokes into the mold their ends are covered with a protecting-glaze, formed of borax or other suitable material. The mold is then closed, and when convenient is poured, the rim-mold being poured first, and after the metal of the rim has set and most of the shrinkage toward the center of the wheel has taken place the hub is poured. The molten metal for both rim and hub is poured at a temperature enough higher than that actually required to permit the metal to fill the mold to overcome the tendency of the spokes to chill the metal about their ends and to raise the ends of the spokes to a welding heat. The heat, together with the great pressure caused by the contraction of the metal about the ends of the spokes, welds the spokes into the hub and rim. After the wheel has cooled it is annealed at a cherry-red heat to remove the brittleness of the cast metal, to relieve internal stresses, and to restore the metal of the spokes to its original condition. The hub may then be bored for the reception of the axle, and because of the softness of the metal of the hub this can be done very readily.

Having thus completely described my invention, what I claim, and desire to secure by Letters Patent, is—

A car-wheel having a hard cast-steel rim and a soft cast-steel hub connected by a series of spokes formed separately from the hub and rim, from a tough welding metal, and welded into the hub and rim so as to produce an integral wheel, substantially as described.

In testimony whereof I affix my signature in presence of two witnesses.

FERDINAND E. CANDA.

Witnesses:
CHARLES P. HANYHAN,
H. M. MARBLE.